United States Patent [19]
Hughes

[11] 3,940,713
[45] Feb. 24, 1976

[54] STIMULATED BRILLOUIN SCATTERED (SBS) TUNED LASER
[75] Inventor: Richard Swart Hughes, China Lake, Calif.
[73] Assignee: The United States of America as represented by the Secretary of the Navy, Washington, D.C.
[22] Filed: Nov. 11, 1974
[21] Appl. No.: 522,387

[52] U.S. Cl. .................. 331/94.5 C; 331/94.5 N
[51] Int. Cl.² .......................................... H01S 3/10
[58] Field of Search ................. 331/94.5; 350/161

[56] References Cited
UNITED STATES PATENTS
3,395,961   8/1968   Ready ........................ 331/94.5

Primary Examiner—William L. Sikes
Attorney, Agent, or Firm—R. S. Sciascia; Roy Miller

[57] ABSTRACT

A stimulated Brillouin scattered (SBS) tuned laser which utilizes stimulated Brillouin scattering wherein the output laser beam produces the acoustic wave that scatters the laser beam to thereby provide the scanning which impacts on a retoreflective grating to provide a change in the frequency of the output laser beam.

3 Claims, 1 Drawing Figure

STIMULATED BRILLOUIN SCATTERED (SBS) TUNED LASER

CROSS REFERENCES TO RELATED APPLICATIONS

U.S. Pat. application Ser. No. 374,746 filed 28 June 1973 by Richard S. Hughes, "Acousto Optical Deflecter Tuned Organic Dye Laser."

U.S. Pat. application Ser. No. 518,313 filed 29 Oct. 1974 by Richard S. Hughes, "Electro Optic Defraction Grating Tuned Laser."

BACKGROUND OF THE INVENTION

1. Field of the Invention

The invention is concerned with rapid tuning of a laser without using mechanical means with the attendant disadvantages accruing due to the relatively large mass of the mechanical devices to obtain tuning of the output laser beam.

2. Description of the Prior Art

Co-pending U.S. Pat. application 287,113 filed 1 Sept., 1972 by Richard S. Hughes, "Rapidly Tunable Laser", discusses the prior art and prior methods of obtaining frequency tuning of the output laser beam from a laser medium. One of the devices utilized continuous tuning of a narrow band laser emission by simply rotating a dispersing element. Another method of tuning the output frequency of a laser is illustrated and described in U.S. Pat. No. 3,422,370.

In addition, co-pending U.S. Pat. applications 374,746 "Acousto Optical Deflecter Tuned Organic Dye Laser" and U.S. Pat. application Ser. No. 518,313 filed 29 Oct. 1974 "Electro Optic Defraction Grating Tuned Laser" describe two other methods, one utilizing the acousto optic effect and the other the electrooptic effect for rapidly tuning in frequency the output beam from a laser.

SUMMARY OF THE INVENTION

Briefly, the invention comprises a laser medium, an output mirror at one side thereof, an angle sensitive filter or reflection element at the opposite side of the laser medium and a piezo electric semi-conductor which exhibits the phenomenon of stimulated Brillouin scattering (SBS) between the laser medium and the angle sensitive filter or reflection element. The system makes use of the very intense intracavity laser beam to induce scattering within the piezo electric semi-conductor. In addition the piezo semi-conductor is connected to a source of voltage which may be varied in frequency and intensity to vary the output angle of the laser beam from the piezo electric semi-conductor so that the angle of incidence on the angle sensitive filter or reflection element is changed, thereby causing the output beam of the laser medium from the output mirror to be changed in optical frequency.

BRIEF DESCRIPTION OF THE DRAWING

The figure is an exploded diagrammatic view of a preferred embodiment of the present invention.

The system as set forth in the block diagram of the FIGURE comprises a continuously tunable laser medium 10 such as an organic dye, an output mirror 11, a piezo electric semi-conductor material 12, a reflection diffraction grating 13 and a source of voltage 14 which is connected to the piezo electric semi-conductor material 12. The laser medium may be energized by any suitable source such as a photo flash, another laser, etc. as set forth in co-pending U.S. Pat. application 287,113 filed 1 Sept. 1972 by Richard Hughes, "Rapidly Tunable Laser." The value of reflectivity of the output mirror 11 is not critical. The output mirror need only provide sufficient feedback to provide for laser action and the laser materials gain, length, etc. will dictate the optimum reflectivity. The laser material for medium 10, is in this case an organic dye dissolved in an appropriate solvent. The normal emission of an organic dye laser is broadband with a typical halfwidth of 100 A.

Figure 1:
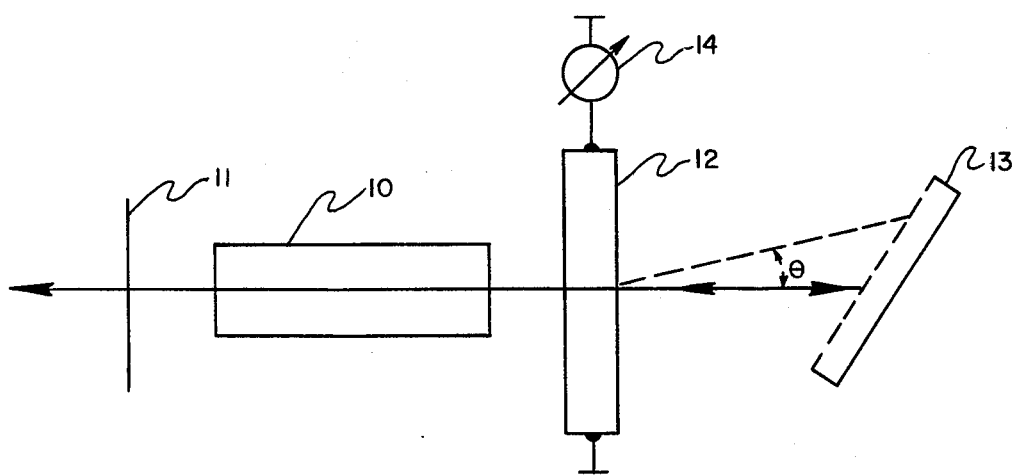

By providing a wavelength selective bandpass filter within the laser cavity, the wavelength of the laser emission may be tuned. Laser emission of a typical organic dye laser can be tuned or varied over a 300 A wide range. The piezo electric semi-conductor 12 and diffraction grating 13 provide such a wavelength selective filter. The semi-conductor 12 is a laser beam scanner which makes use of stimulated Brillouin scattering or SBS to provide the spatial scan. Such a device is set forth in detail in U.S. Pat. No. 3,633,994 and no further discussion is made with respect thereto. The spatial scan provided by the piezo electric semi-conductor 12 is used in conjunction with one of severalangle sensitive filters or reflection elements, (i.e., Fabry-Perot interferometer or prism-mirror combination or a reflective diffraction grating as is set forth in the present case. In this embodiment, a reflection diffraction grating 13 is used in the retroflective mode. In this mode, the angle of incidence determines the reflected wavelength. Thus, by varying the angle of incidence, $\theta$, one can provide a high Q optical cavity which varies in wavelength.

The system herein described makes use of the very intense intracavity laser beam to induce scattering within the deflector 12. The phenomenon of stimulated Brillouin scattering or SBS, in which the acoustic wave that scatters the optical beam is produced by the optical beam itself was discovered in 1964 and is described by R. Y. Chiav, C. H. Townes and S. P. Stoicheft, in *Phys. Rev. Lett.*, 12 Page 592 (1964).

In the present case, the application of a sufficiently intense optical field at frequency $\omega_2$ causes a simultaneous generation of an optical beam at $\omega_1$ and an acoustic wave at $\omega_3 = \omega_2 - \omega_1$. The device described in U.S. Pat. No. 3,633,994 provides for a beam scanner in which the angle at which the deflected beam, $\omega_1$, emerges is varied by varying the applied voltage to the semi-conductor material. The varying voltage varies the direction of maximum acoustic gain at the frequency that corresponds to the Bragg angle. This in turn varies the direction of the acoustic wave. Thus, in the present case, varying the voltage of 14 varies the direction of maximum acoustic gain in the crystal 12.

One of the unique features of the present laser is the very wide optical bandwidth over which it can be turned. This is provided for by the large deflection angle obtained by utilizing SBS (the scan angle using SBS is at least a factor of 5 greater than conventional acoustic techniques). The expression for the threshold for SBS indicates that this technique can be used with other state of the art laser systems. This is set forth in *Quantum Electronics*, Amnon Yarin, pages 438 and 439 Equation (25.3-6).

What is claimed is:

1. A rapidly tunable laser comprising;

a laser medium for producing an output beam;

an output mirror in line with said laser beam on one side of said laser medium;

reflective means in line with said laser beam on the side of said laser medium opposite that of said output mirror for reflecting said laser beam capable of responding to the angle of incidence of a beam thereon such that the reflected wavelength of the incident beam is determined by the angle of incidence on the reflective means;

piezoelectric semi-conductor means between said laser medium and said reflective means for causing said laser beam to angle scan;

means for creating an electric field within said semi-conductor along a given direction in said semi-conductor;

means for causing stimulated Brillouin scattering in the semi-conductor;

and means for continuously varying either the magnitude or direction of the electric field in the semi-conductor so as to affect a change in the angle of the scattering;

said reflective means being responsive to the angle of incidence thereon of the laser beam, thereby determining the reflective wavelength and the frequency of the output laser beam from said output mirror.

2. A rapidly tunable laser as set forth in claim 1 wherein;

said means for causing stimulated Brillouin scattering in the semi-conductor comprises the intracavity laser beam.

3. A rapidly tunable laser as set forth in claim 1 wherein;

said reflective means comprises a reflection defracting grating used in the retroflective mode.

* * * * *